June 1, 1937.  S. S. STAFFORD  2,082,226
FLUSH VALVE
Filed Aug. 7, 1936
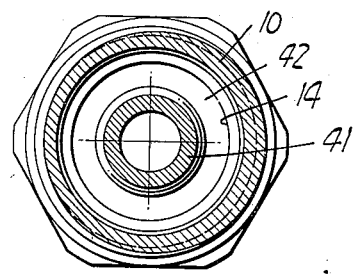
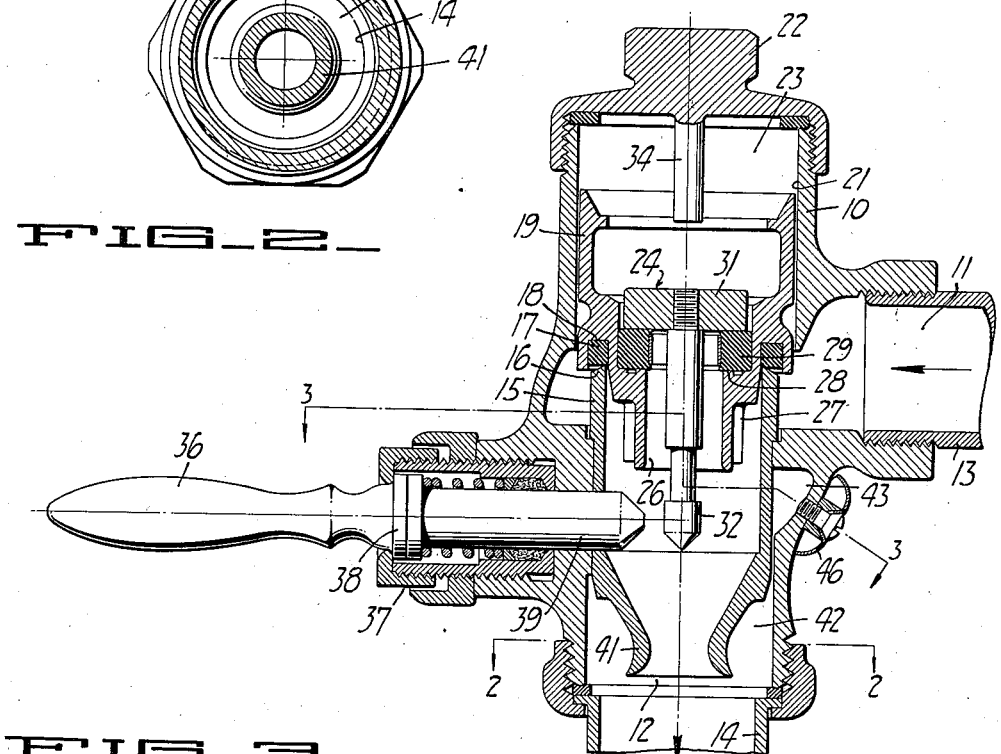
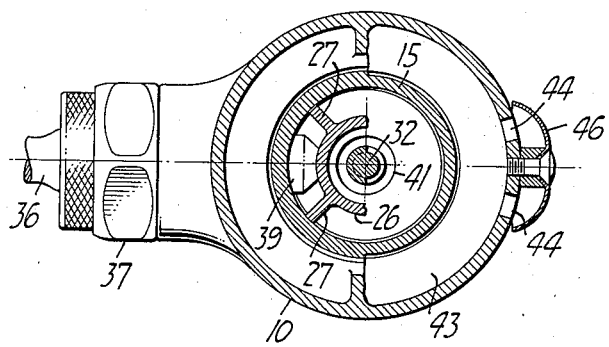
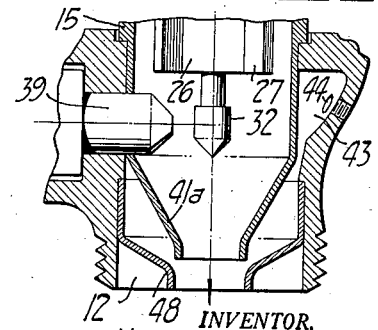
INVENTOR.
Sedley S. Stafford
BY Paul D. Flehr
ATTORNEY Patented June 1, 1937

2,082,226

UNITED STATES PATENT OFFICE 2,082,226

FLUSH VALVE

Sedley S. Stafford, San Francisco, Calif., assignor to Dalmo Sales Corporation, San Francisco, Calif., a corporation of California Application August 7, 1936, Serial No. 94,787

1 Claim. (Cl. 137—93)

This invention relates generally to pressure operated flush valves of the type used in conjunction with water closets.

It is an object of the invention to provide a flush valve of the above character having non-syphoning characteristics. I have reference to the fact that my valve prevents sucking of contaminated water from the bowl back into the water-supply line, when the pressure of the water line falls below atmospheric.

Another object of the invention is to provide a non-syphoning flush valve of utmost simplicity, without resorting to the use of check valves or like unsatisfactory devices.

Further objects of the invention will appear from the following description in which the preferred embodiment of the invention has been set forth in detail in conjunction with the accompanying drawing.

Referring to the drawing:

Fig. 1 is a side elevational view, in cross section, illustrating a flush valve incorporating the present invention.

Fig. 2 is a cross-sectional view taken along the line 2—2 of Fig. 1.

Fig. 3 is a cross-sectional view taken along the line 3—3 of Fig. 1.

Fig. 4 is a fragmentary cross-section of a modified form of the flush valve shown in Fig. 1.

The flush valve illustrated in the drawing consists of a hollow body 10, provided with inflow and outflow openings 11 and 12. The inflow opening 11 is adapted to be connected to the water supply pipe 13, while the outflow opening 12 is adapted to be connected to a pipe 14, leading to a closet bowl. Mounted within the body 10 there is a cylindrical sleeve 15, the upper end of which is formed to provide a valve seat 16. Cooperating with the seat 16 there is a valve ring 17, formed of rubber or composition, and shown carried within a groove 18, formed in the piston 19.

The body 10 is formed to provide a cylindrical bore or cylinder 21 in which the piston 19 is slidably fitted. The upper end of the valve body is shown closed by the cap 22, and the space between this cap and the piston 19, forms a fluid pressure chamber 23. Sufficient clearance is provided between the peripheral surface of piston 19, and the adjacent surfaces of the cylinder bore 21 so that the pressure chamber 23 is in restricted communication with the inlet passage 11. It will be evident that the lower portion of piston 19, together with ring 17, forms a main valve member for a controlling flow of water through the valve body.

The piston 19 also carries pilot valve means 24, which can be constructed as follows: Extending downwardly from the piston, into the sleeve 15, there is a collar 26. Webs 27, formed on the collar 26, engage the inner peripheral surface of the sleeve 15, and serve to guide the piston 19 in its vertical movements. At the upper end of the collar 26 there is an annular shoulder 28, carrying a ring 29 of resilient rubber or like material. Loosely supported upon the upper face of ring 29, there is a pilot valve member 31, to which the depending stem 32 is secured. The cap 22 carries a depending pin 34, the lower end of which is adapted to engage the pilot valve member 31, and thus limit upward movement of the piston 19.

For opening the pilot valve member 24, to initiate a cycle of operation, there is an operating handle 36. This handle has a swivel mounting in a fitting 37, and the head 38 formed on its inner end is adapted to engage and operate a sliding plunger 39. It will be noted that the inner end of plunger 39 extends through an aperture formed in sleeve 15, and that when the plunger is projected, it effects a lateral displacement of the pilot valve stem 32.

Disposed immediately above the outlet 12 there is a restricted discharge nozzle 41, shaped to conform substantially to a Venturi tube. This nozzle is preferably formed integral with the lower end of the cylindrical sleeve 15. Surrounding the nozzle 41 there is an annular space 42, which is in communication with a pocket 43 located around the sleeve 15. The pocket 43 is in turn vented to the atmosphere through openings 44. A suitable cap 46 is mounted upon the valve body, and serves as a protection for the openings 44.

Operation of my valve can now be briefly described as follows:—When force is applied to the handle 36, plunger 39 is projected inwardly, to laterally displace the pilot valve stem 32, to open the pilot valve member 31, thus permitting water under pressure to escape from chamber 23. The upward force of water upon the piston 19, from the inlet side of the valve, causes the piston 19 to rise, thus permitting water to flow down through the sleeve 15, to be discharged as a jet into the pipe 14. Such jetting of water from nozzle 41 causes space 42 to be partially evacuated by virtue of an aspirating action, with the result that air from the atmosphere is sucked in through openings 44. Upon raising of the piston 19, pilot valve member 31 is again closed, and as water pressure builds up in chamber 23, the piston moves downwardly to again engage ring 17 with the seat 16.

If water pressure on the inflow side of the valve falls below atmospheric, either when the valve is closed, or during operation of the same, no water can be syphoned back through the device, because air is sucked from the atmosphere through openings 44, in preference to sucking back water from the pipe 14. Thus my valve is positive in its non-syphoning action, and this characteristic is obtained without the use of check valves or like devices, which require differential fluid pressures for their operation.

Under certain conditions of operation, I have found that with the device as described above, there may be a back swirl of water from the pipe 14, sufficient to discharge a small amount of water from the vent 44. This can be avoided by the construction of Fig. 4. In this instance, in place of using only one nozzle 41a, a second nozzle or Venturi throat 48 is disposed immediately below the same. The opening in nozzle 48 is slightly larger than the opening in nozzle 41a, and the two openings are aligned. Thus while any syphoning is broken as in the modification previously described, the second nozzle 48 prevents swirling water from discharging through vent 44.

I claim:

In a flush valve, a valve body having an inlet for connection with a source of water under pressure and also having a downwardly directed outlet for connection with a closet bowl, a sleeve fitted within said body, the upper end of said sleeve forming a valve seat, a movable valve member cooperating with the valve seat, a fluid pressure operated member connected to the valve member, there being a closed space above said fluid operated member forming a pressure chamber having restricted communication with the inflow side of the valve body, a pilot valve member adapted to vent said space, an operating member movably carried by the valve body and serving to operate said pilot valve member, one side wall of said sleeve having an opening in the same to snugly accommodate the operating member, whereby the operating member may reciprocate in a direction substantially at right angles to the axis of the sleeve, a downwardly directed restricted flow nozzle located within the valve body and formed integral with the lower end of said sleeve, there being a space surrounding said nozzle adapted to be evacuated by the aspirating effect of water discharged through the same, said space being vented to the atmosphere at a point above the lower end of the nozzle.

SEDLEY S. STAFFORD.